(12) United States Patent
Kemmerer et al.

(10) Patent No.: US 6,968,855 B1
(45) Date of Patent: Nov. 29, 2005

(54) AIR OPERATED FLUID CONTROL VALVE

(75) Inventors: James H. Kemmerer, Sweet Springs, MO (US); Randal D. Craig, Sedalia, MO (US); Dilbert G. Clark, Mora, MO (US)

(73) Assignee: Hayes Lemmerz International, Inc., Northville, MI (US)

( * ) Notice: Subject to any disclaimer, the term of this patent is extended or adjusted under 35 U.S.C. 154(b) by 226 days.

(21) Appl. No.: 10/331,959

(22) Filed: Dec. 30, 2002

(51) Int. Cl.[7] ............................................. F16K 51/00
(52) U.S. Cl. .......................... 137/377; 251/62; 251/63
(58) Field of Search ....................... 137/377; 251/63.5, 251/63, 62

(56) References Cited

U.S. PATENT DOCUMENTS 2,694,545 A * 11/1954 Steenbergh ................. 251/63.5
6,672,561 B2 * 1/2004 Kerg et al. ................. 251/63.5

* cited by examiner

Primary Examiner—Kevin Lee
(74) Attorney, Agent, or Firm—MacMillan, Sobanski & Todd, LLC

(57) ABSTRACT

This invention relates to an improved air operated fluid control valve which tends to inhibit or impede the travel of a fluid to the air controlled side of the control valve. The air operated fluid control valve includes a control valve having a valve body provided with at least one fluid inlet port and at least one fluid outlet port, at least one air inlet port and at least one air outlet port, and a piston assembly selectively controlled by the air inlet and outlet ports so as to regulate the flow of a fluid through the valve body from the at least one fluid inlet port to the at least one fluid outlet port. According to one preferred embodiment of this invention, the control valve includes at least one shield member carried by piston assembly which is operative to inhibit the travel of a fluid from a fluid side of the control valve into an air controlled side of the control valve.

19 Claims, 6 Drawing Sheets

AIR OPERATED FLUID CONTROL VALVE

BACKGROUND OF THE INVENTION

This invention relates in general to fluid control valves and in particular to an improved air operative fluid control valve.

Air operated fluid control valves are known for supplying a fluid to a workpiece, workstation, or for other desired applications. A typical air operated fluid control valve includes a fluid side and an air side. The air side provides a source of air which is used to regulate the valve in order to deliver a fluid, such as a glue, adhesive, sealant, etc., from the valve to the desired application. Over time, the seals provided in the control valve will tend to wear and eventually, the fluid will migrate from the fluid side to the air side of the valve. When this occurs, the fluid will travel past the seals to the air side and prevent the proper operation of the control valve.

SUMMARY OF THE INVENTION

This invention relates to an improved air operated fluid control valve which tends to inhibit or impede the travel of a fluid to the air controlled side of the control valve. The air operated fluid control valve includes a control valve having a valve body provided with at least one fluid inlet port and at least one fluid outlet port, at least one air inlet port and at least one air outlet port, and a piston assembly selectively controlled by the air inlet and outlet ports so as to regulate the flow of a fluid through the valve body from the at least one fluid inlet port to the at least fluid outlet port. According to one preferred embodiment of this invention, the control valve includes at least one shield member carried by piston assembly which is operative to inhibit the travel of a fluid from a fluid side of the control valve into an air controlled side of the control valve.

Other advantages of this invention will become apparent to those skilled in the art from the following detailed description of the preferred embodiments, when read in light of the accompanying drawings.

DESCRIPTION OF THE PREFERRED EMBODIMENTS

Figure 1:
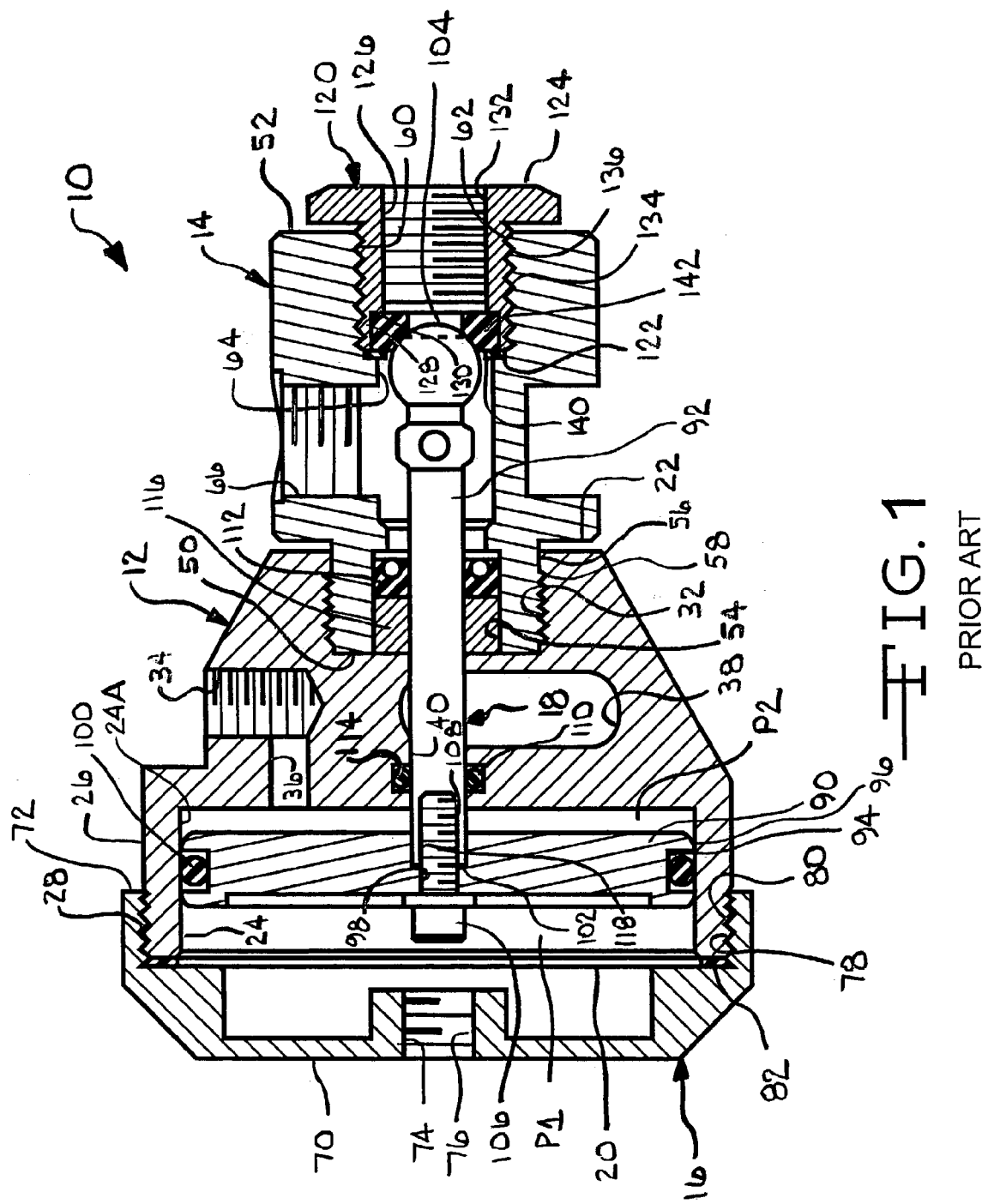
FIG. 1 is a sectional view of a first embodiment of a prior art pneumatically controlled glue valve.
Figure 2:
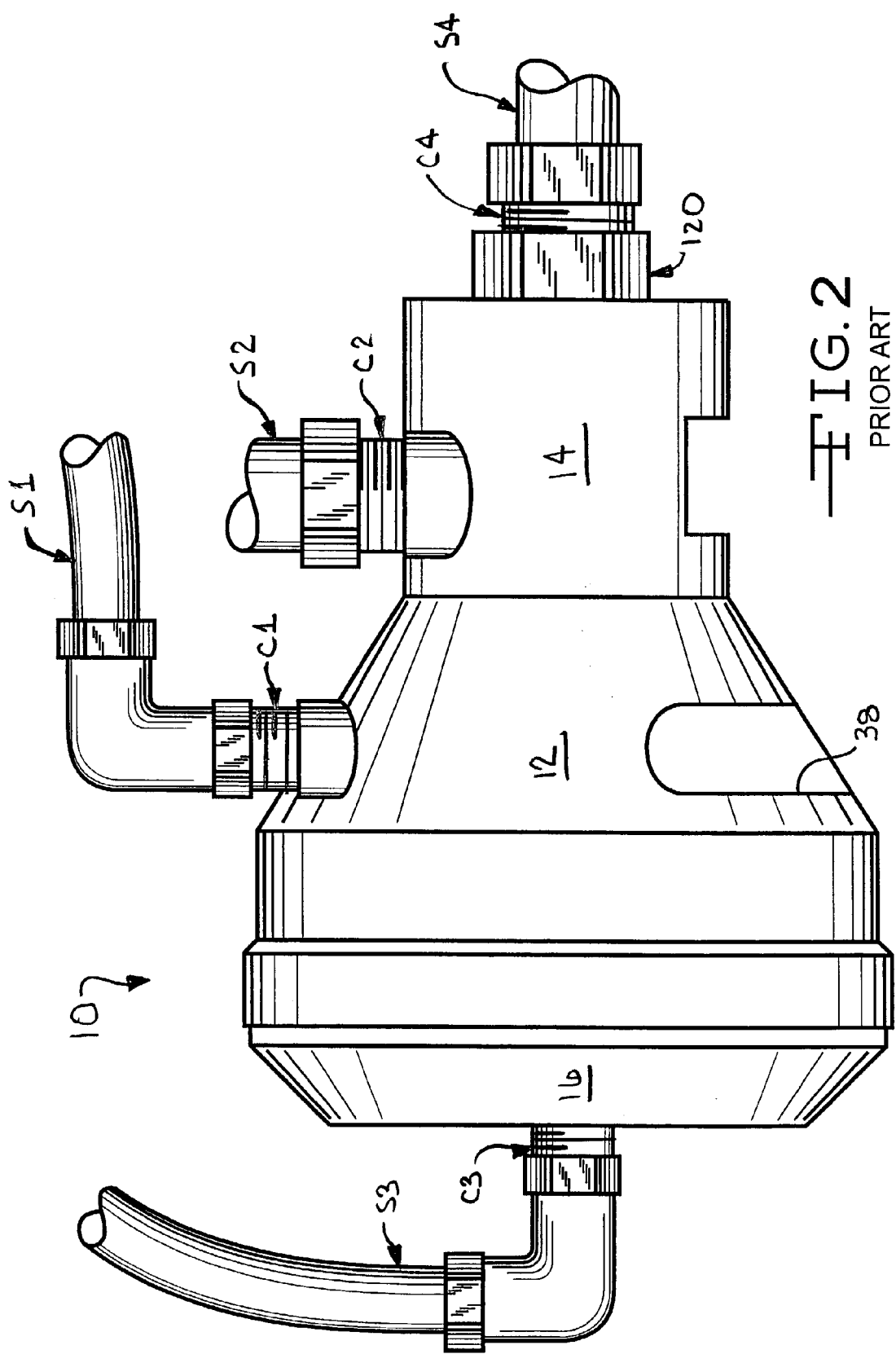
FIG. 2 is a plan view of a portion of a prior art glue supply system including the first embodiment of the prior art air operated fluid control valve illustrated in FIG. 1.

Referring now to the drawings, there is illustrated in FIGS. 1 and 2 a prior art air operated fluid control valve, indicated generally at 10. The prior art air operated fluid control valve 10 is commercially available from Sealant Equipment and Engineering, Inc., of Plymouth, Mich., Model No. 2200-396-016 No-Drip® 60:1 Dispense Valve. The general structure and operation of the prior art air operated fluid control valve 10 is conventional in the art. Thus, only those portions of the prior art air operated control valve 10 which are necessary for a full understanding of this invention will be explained and illustrated. Although this invention will be described and illustrated in conjunction with the particular air operated fluid control valve constructions disclosed herein, it will be appreciated that this invention may be used in conjunction with other pneumatically and non-air operated fluid control valve constructions.

As shown therein, the prior art fluid control valve 10 includes a valve body 12, a fluid body 14, a valve cap 16, and a piston rod assembly 18. The valve body 12 is formed from a suitable material, such as for example, steel or aluminum, and is of a generally stepped configuration. The valve body 12 includes a generally opened first end 20 and a generally opened opposite second end 22. The first end 20 includes a generally cylindrical non-threaded counterbore or recess 24 provided therein. The first end 20 includes an outer surface 26 having an externally threaded section 28 along a portion thereof. The second end 22 of the valve body 12 includes an internally threaded counterbore or recess 32 provided therein.

The valve body 12 further includes openings 34, 36, 38 and 40. The opening 34 is a threaded opening and, as shown in prior art FIG. 2, is adapted to receive a suitable threaded connector C1 of a supply line S1 for a purpose to be discussed below. The opening 36 defines a passageway and is effective to operatively connect the supply line S1 to the counterbore 24 of the valve 10 as will be discussed below. In this embodiment, the supply line S1 is a pneumatic supply line and is operative to supply compressed air to the prior art fluid control valve 10 to actuate and open the valve as will be discussed below. The opening 38 is a generally elongated opening and extends at least through a portion of the valve body 12. The opening 38 defines a drip or relief opening. The opening 40 extends clear through the valve body 12 from the first end 20 to the second end 22 and also extends through the opening 38 so as to be in communication therewith for a purpose to be discussed below.

The valve head 14 is formed from a suitable material, such as for example, steel or aluminum, and is of a generally stepped configuration. The valve head 14 includes a generally opened first end 50 and a generally opened opposite second end 52. The first end 50 includes a generally cylindrical non-threaded counterbore or recess 54 provided therein and outer surface 56 having an externally threaded section 58 along a portion thereof. The externally threaded section 58 of the valve head 14 is adapted to be threadably disposed in the internally threaded counterbore 32 of the valve body 12 to secure the first end 50 of the valve head 14 to the second end 22 of the valve body 12. The second end 52 of the valve head 14 includes a stepped counterbore or recess 60 provided therein. The counterbore 60 includes an internally threaded first portion 62 and a reduced diameter non-threaded second section 64 which extends toward the first end 50.

The valve head 14 further includes an opening 66 provided therein. The opening 66 is a threaded opening 34 and, as shown in prior art FIG. 2, is adapted to receive a suitable threaded connector C2 of a supply line S2 for a purpose to be discussed below. The opening 66 is effective to operatively connect the fluid supply line S2 to the counterbore 54 of the valve 10 as will be discussed below. In this embodiment, the supply line S2 is a fluid supply line and is operative to supply a glue or sealant to the prior art fluid control valve 10 as will be discussed below.

The valve cap 16 is formed from a suitable material, such as for example, steel or aluminum, and is of a generally stepped configuration. The valve cap 16 includes a generally closed first end 70 and a generally opened opposite second end 72. The first end 70 includes an opening 74 formed therethrough. The opening 74 includes an internally threaded section 76 and is adapted to receive a suitable threaded connector C3 of a supply line S3 for a purpose to be discussed below. The opening 74 is effective to operatively connect the supply line S3 to the first end 20 of the valve body 12 as will be discussed below. In this embodiment, the supply line S3 is a pneumatic supply line. The supply line S3 cooperates with the supply line S1 to regulate the supply and flow of the compressed air to the prior art fluid control valve 10 to thereby selectively open and close the valve to supply an adhesive from the fluid supply line S2 to the valve where it is discharged through the fluid body 14 to a fluid supply line S4 (shown in prior art FIG. 2), as will be discussed below.

The second end 72 of the valve cap 16 includes a stepped counterbore or recess 78 provided therein. The counterbore 78 is provided with internal threads 80. The externally threaded section 28 of the valve head 12 is adapted to be threadably disposed in the internally threaded counterbore 78 of the valve cap 16 to secure the first end 20 of the valve body 12 to the second end 72 of the valve cap 16. A gasket or seal 82 is disposed in the counterbore 78 of the valve cap 16 and is operative to sealingly engage the first end 20 of the valve body 12 during the assembly of the valve body 12 to the valve cap 16 to provide an air-tight seal therebetween.

The piston rod assembly 18 includes a piston 90 and a piston rod 92. The piston 90 is formed from a suitable material, such as for example, steel, aluminum or plastic, and is generally annular shaped. The piston 90 includes an annular recess or groove 94 provided in an outer surface 96 thereof and a generally central opening 98 formed therethrough. A seal 100 formed from a suitable material, such as an elastomeric material, is disposed in the piston groove 94. The seal 100 sealingly engages a side wall surface 24A of the counterbore 24 of the valve body 12 to define a pair of pneumatic chambers P1 and P2 on the opposite sides of the piston 90. In the illustrated embodiment, the seal 100 is an O-ring seal.

The piston rod 92 is formed from a suitable material, such as for example, steel or aluminum, and includes a first end 102 and an opposite second end 104. The first end 102 of the piston rod 92 is attached to the piston 90 by suitable means. In the illustrated embodiment, this is accomplished by a threaded fastener 106. The fastener 106 extends through the opening 98 of the piston 90 and external threads 108 thereof are threadably received in an internally threaded opening 118 provided in the first end 102 of the piston rod 92 to thereby secure the first end 102 of the piston rod 92 to the piston 90. The second end 104 of the piston rod 92 has a generally ball-shaped configuration for a purpose to be discussed below.

The prior art air operated fluid control valve 10 includes a first seal 110, a second seal 112, and a bearing 116 disposed about the piston rod 92. The first seal 110 is an annular fluid seal and is disposed in an annular groove 114 provided in the valve body 12. The second seal 112 is disposed in the counterbore 54 of the first end 50 of the fluid body 14. The bearing 116 is disposed in the counterbore 54 of the first end 50 of the fluid body 14 adjacent the second seal 112.

The prior art fluid control valve 10 further includes a fluid connector or coupling 120 attached to the second end 52 of the fluid body 14. The coupling 120 is formed from a suitable material, such as for example, steel or aluminum. The coupling 120 includes a generally opened first end 122 and a generally opened opposite flanged second end 124. The coupling 120 is provided with a stepped opening 126 formed therethrough. The opening 126 includes a non-threaded portion 128 adjacent the first end 122, an intermediate shoulder 130, and an internally threaded portion 132 adjacent the second end 124. The threaded portion 132 of the coupling 120 is adapted to receive a suitable threaded connector C4 of a supply line S4 for a purpose to be discussed below. In this embodiment, the supply line S4 is a fluid supply line and is operative to supply the glue or sealant from the prior art fluid control valve 10 to a desired work station, surface of a component part, or the like (none of which are shown).

The coupling 120 further includes an outer surface 134 provided with external threads 136. The external threads 136 of the coupling 120 are adapted to be threadably disposed in the internally threaded counterbore 62 of the fluid valve 14 to secure the coupling 120 to the second end 52 of the fluid valve 14. A gasket or seal 140 is disposed in counterbore 60 of the valve head 14 and is operative to sealingly engage a portion of the first end 122 of the coupling 120 during the assembly of the coupling 120 to the fluid body 14. The coupling 120 further includes a seat member 142 disposed in the non-threaded portion 128 of the opening 126 of the coupling 120 between the gasket 140 and the shoulder 130. The seat member 142 is operative to sealingly engage the ball shaped end 104 of the piston rod 92 for a purpose to be discussed below. The seat member 142 is formed from a suitable material, such as for example, and elastomeric material.

In operation, a suitable fluid, such as compressed air, is selectively supplied to the prior art fluid control valve 10 to cause the fluid control valve 10 to be selectively moved or actuated between a closed position (shown in prior art FIG. 1) and an opened position (not shown). In particular, pressurized or compressed air is supplied to the fluid control valve 10 via the supply line S1 to cause the piston rod assembly 18 to be moved to the left when viewing FIG. 1. As a result of this movement of the piston rod assembly 18, the ball shaped second end 104 of the piston rod 92 is moved off of the seat member 142 to allow a fluid, such as for example, adhesives, sealants and lubricants, to travel through the valve 10 from the supply line S2, through the fluid body 14 and the coupling 120, to the supply line S4. This is the opened position or actuated state of the prior art fluid control valve 10 (not shown). To move the fluid control valve 10 back to the closed position (shown in FIG. 1), the compressed air is supplied to the valve 10 via the supply line S3 to cause the piston rod assembly to move to the right when viewing FIG. 1. As a result of this movement of the piston rod assembly 18, the ball shaped second end 104 of the piston rod 92 is moved against the seat member 142 to prevent the flow of a fluid through the valve. The structure and operation of the prior art air operated fluid control valve 10 thus far described is conventional in the art.

Figure 3:
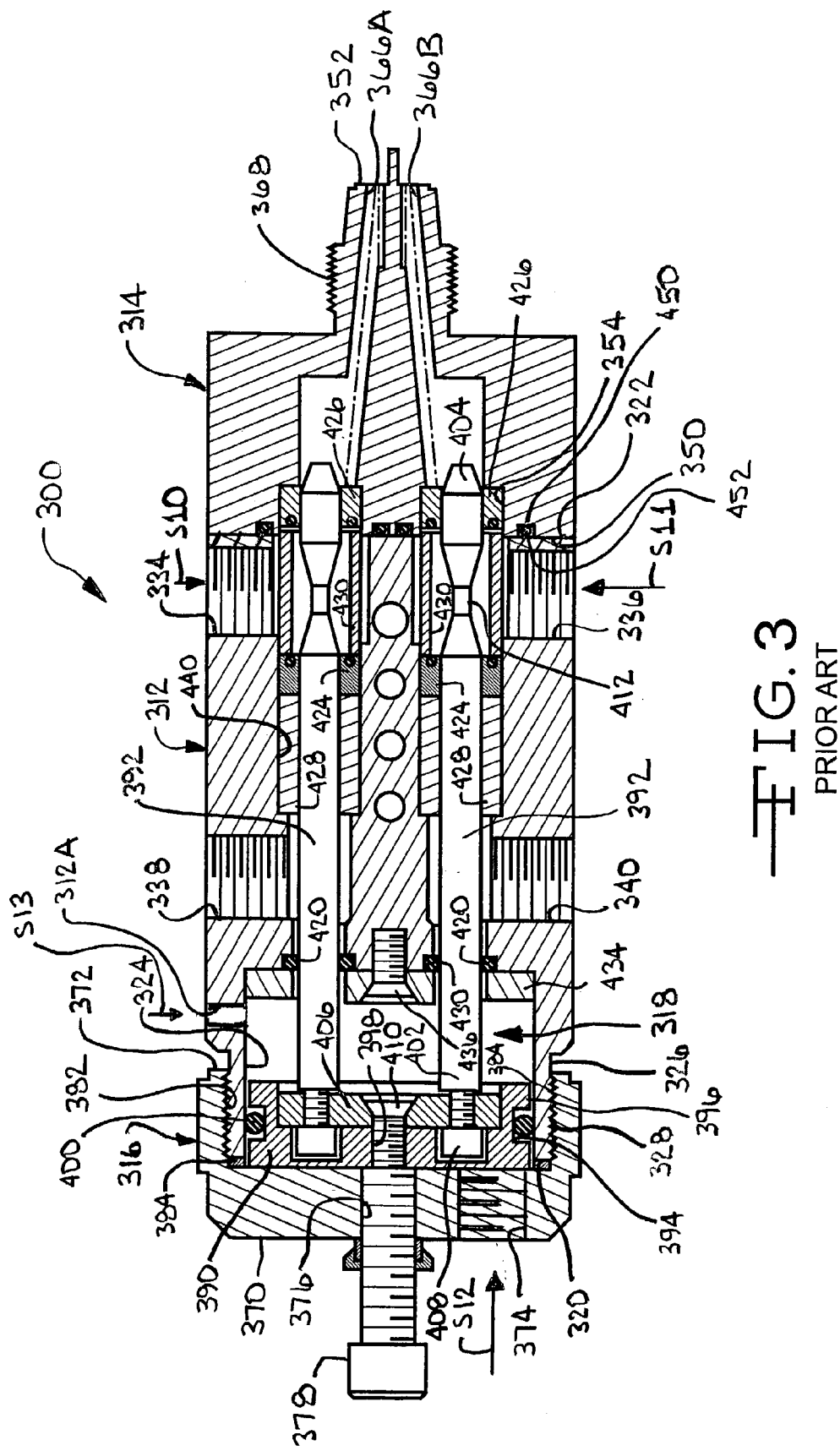
FIG. 3 is a sectional view of a second embodiment of a prior art glue valve.

Referring now to FIG. 3, there is illustrated a prior art air operated fluid control valve, indicated generally at 300, which is similar in structure and operation to that of prior art fluid control valve 10 described above and illustrated in prior art FIGS. 1 and 2. The main differences between the prior art fluid control valves 10 and 300 is that prior art fluid control valve 300 includes a dual piston rod assembly which is operative to dispense a two component material, as will be discussed below, and which in cooperation with the fluid supply lines is operative to create a vacuum when the valve is closed which tends to withdraw or suck back any fluid contained therein. The prior art air operated fluid control valve 300 is commercially available from Sealant Equipment and Engineering, Inc., of Plymouth, Mich., Model No. 2200-250-019 Snuf-Bak™ Dual Component Dispense Valve. The general structure and operation of the prior art air operated fluid control valve 300 is conventional in the art. Thus, only those portions of the prior art air operated fluid control valve 300 which are necessary for a full understanding of this invention will be explained and illustrated. Although this invention will be described and illustrated in conjunction with the particular air operated fluid control valve constructions disclosed herein, it will be appreciated that this invention may be used in conjunction with other air and non-air operated fluid control valve constructions.

As shown therein, the prior art fluid control valve 300 includes a valve body 312, a valve head 314, a valve cap 316, and a dual piston rod assembly 318. The valve body 312 is formed from a suitable material, such as for example, steel or aluminum, and includes a generally opened first end 320 and a generally opened opposite second end 322. The first end 320 includes a generally cylindrical non-threaded counterbore or recess 324 provided therein. The first end 320 includes an outer surface 326 having an externally threaded section 328 along a portion thereof. The valve body 312 further includes openings 334, 336, 338 and 340. The openings 334 and 336 are threaded openings and each is adapted to receive a suitable threaded connector (not shown) of an associated fluid supply line, schematically shown by arrows S10 and S11, respectively, for a purpose to be discussed below.

The valve head 314 is formed from a suitable material, such as for example, steel or aluminum, and is of a generally stepped configuration. The valve head 314 includes a generally opened first end 350 and a generally closed opposite second end 352. The first end 350 includes a pair of generally cylindrical non-threaded counterbores or recesses 354 provided therein. The valve head 314 is secured to the valve body 312 by appropriate means, such as for example, by fasteners (not shown). An annular fluid seal 450 is disposed in each of the annular grooves 452 provided in the first end 350 of the valve head 314. The seals 450 are operative to provide a seal between the adjacent end surfaces 322 and 350 of the valve body 312 and valve head 314, respectively.

The second end 352 of the valve head 314 includes a pair of openings 366A and 366B provided therein. The openings 366A and 366B define a pair of nozzles and are in communication with the respective openings 334 and 336 to operatively connect the fluid supply lines S10 and S11 to the respective nozzles 366A and 366B as will be discussed below. Also, the valve head 14 is provided with external threads 368 which are adapted to threadably receive a nozzle fitting (not shown) having a desired nozzle outlet size. In this embodiment, the supply lines S10 and S11 are operative to supply a two component glue or sealant to the prior art fluid control valve 300 as will be discussed below.

The valve cap 316 is formed from a suitable material, such as for example, steel or aluminum, and is of a generally stepped configuration. The valve cap 316 includes a generally closed first end 370 and a generally opened opposite second end 372. The first end 370 includes a first internally threaded opening 374 formed therethrough. The opening 374 is adapted to receive a suitable threaded connector (not shown) of a pneumatic supply line, schematically shown by arrow S12, for a purpose to be discussed below. The opening 374 is effective to operatively connect the associated pneumatic supply line S12 to the first end 320 of the valve body 312 as will be discussed below. The valve body 312 further includes a suitable opening (illustrated for discussion purposes at 312A) which is operatively connected to an associated pneumatic supply line, schematically illustrated by arrow S13. In this embodiment, the supply lines S12 and S13 are operative to regulate the supply of pressurized or compressed air to the prior art fluid control valve 300 to thereby selectively open and close the valve to supply adhesive from the lines S10 and S11 to the valve where it is discharged through the nozzles 366A and 366B as will be discussed below. In prior art FIG. 3, the control valve 300 is shown in the closed position. The first end 370 of the valve cap 316 is further provided with a threaded opening 376 formed therethrough. The opening 376 is adapted to receive an adjust screw 378.

The second end 372 of the valve cap 316 includes a counterbore or recess 382 provided therein. The counterbore 382 is provided with internal threads 384. The externally threaded section 328 of the valve body 312 is adapted to be threadably disposed in the internally threaded counterbore 382 of the valve cap 316 to secure the first end 320 of the valve body 312 to the second end 372 of the valve cap 316. A gasket or seal 384 is disposed in the counterbore 382 of the valve cap 316 and is operative to sealingly engage the first end 320 of the valve body 312 during the assembly of the valve body 312 to the valve cap 316.

The piston rod assembly 318 includes a piston 390 and a pair of piston rods 392. The piston 390 is formed from a suitable material, such as for example, steel or aluminum, and is generally annular shaped. The piston 390 includes an annular recess or groove 394 provided in an outer surface 396 and a generally central threaded opening 398 formed therethrough. An annular seal 400 formed from a suitable material, such as an elastomeric material, is disposed in the groove 394. The seal 400 engages the side wall of the counterbore 324 of the valve body 312 to define a pair of pneumatic chambers on opposite sides of the piston 390. In the illustrated embodiment, the seal 400 is an O-ring seal.

Each of the piston rods 392 are formed from a suitable material, such as for example, steel or aluminum, and includes a first end 402 and an opposite second end 404. The first ends 402 of the piston rods 392 are attached to a retainer 406 by suitable means. In the illustrated embodiment, this is accomplished by a threaded fastener 408. The retainer 406 is attached to the piston 390 by suitable means. In the illustrated embodiment, this is accomplished by a threaded fastener 410. The fastener 410 extends through the retainer 406 and is threadably received in the threaded opening 398 of the piston 390 to thereby secure the retainer 406, and therefore the piston rods 392, to the piston 390. The piston rods 392 near the second ends 404 have a necked down or reduced diameter portion 412 for a purpose to be discussed below.

The prior art air operated fluid control valve 300 includes a pair of first seals 420, a pair of second seals 424, a pair of third seals 426, a pair of bearings 428 disposed about the piston rods 392, and a pair of retainers 430. The pair of first seals 420 are annular fluid seals and are disposed in associated annular groove 430 provided in the valve body 312 and retained therein by a retainer 434 and a fastener 436. The pair of second seals 424 and the bearings 428 are disposed in an associated counterbore 440 provided in the valve body 312. The pair of third seals 426 are disposed in the counterbores 354 of the first end 350 of the fluid body 314. Each of the retainers 430 is disposed in the valve body 312 between an associated pair of the seals 424 and 426.

In operation, a suitable fluid, such as compressed air, is selectively applied to the prior art fluid control valve 300 to cause the fluid control valve 300 to be selectively moved or actuated between a closed position (shown in FIG. 3) and an open position (not shown). In particular, compressed air is supplied to the fluid control valve 300 via the supply line S12 to cause the piston rod assembly 318 to move to the right when viewing in FIG. 3. As a result of this movement of the piston rod assembly 318, the ends 404 of the piston rods 392 are moved to the right in FIG. 3 away from contact with the seals 426 and the reduced diameter portions 412 are operative to allow a fluid, such as glue, to travel through the valve 300 from supply lines S10 and S11, through the openings 334 and 336, into the valve head 314 and then out through the nozzle openings 366A and 366B. This is the open position or actuated state of the fluid control valve 300. To move the fluid control valve 300 back to the closed position, compressed air is supplied to the fluid control valve 300 via the supply line S13 to cause the piston rod assembly to move to the left in FIG. 3 to illustrated closed position. The structure and operation of the prior art air operated fluid control valve 300 thus far described in conventional in the art.

Figure 4:
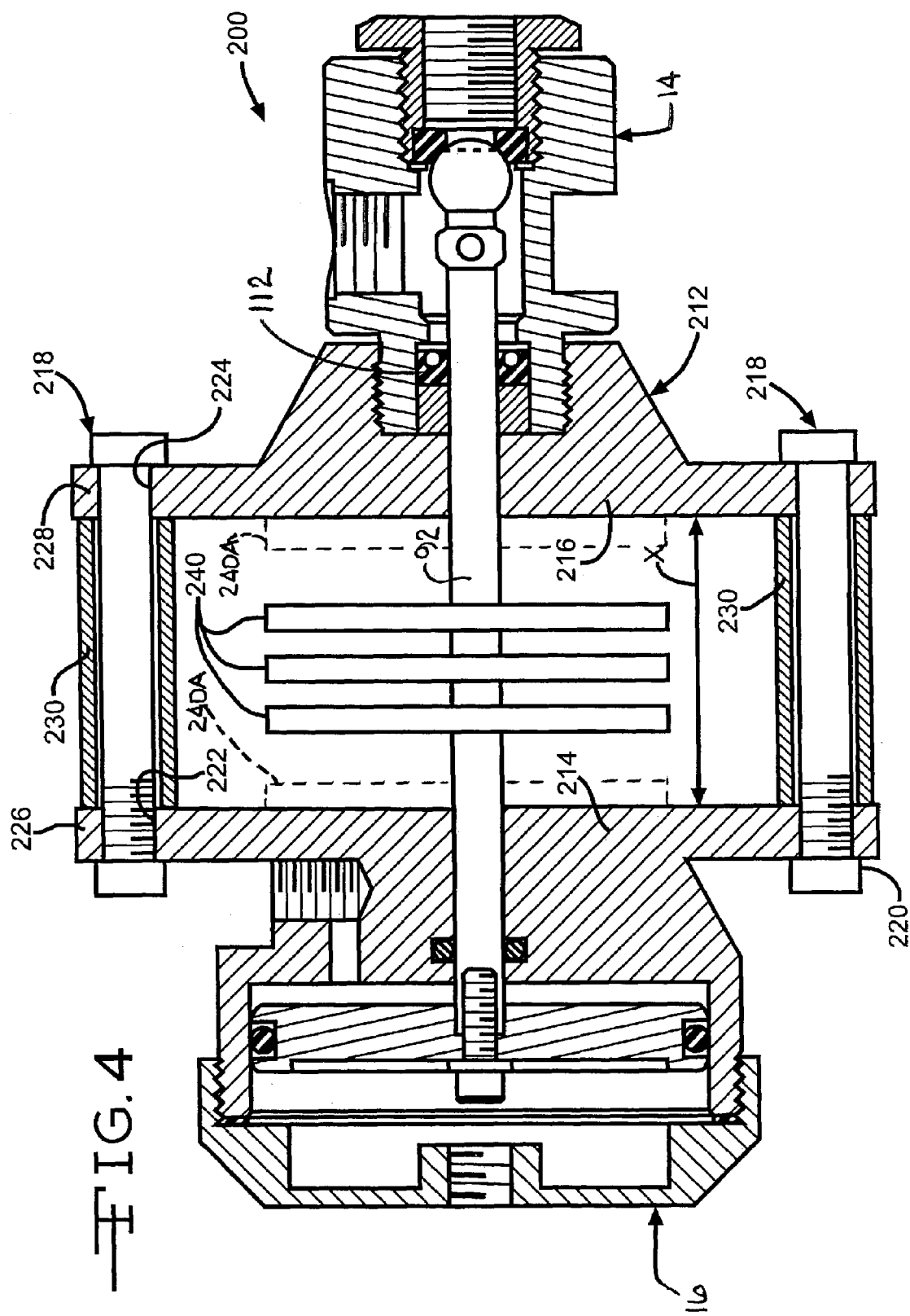
FIG. 4 is a sectional view of a first embodiment of a fluid control valve in accordance with the present invention.

Turning now to FIG. 4 and using like reference numbers to indicate corresponding parts, there is illustrated a first embodiment of an air operated fluid control valve, indicated generally at 200, constructed in accordance with this invention. As shown therein, the fluid control valve 200 is similar to the prior art fluid control valve 10 discussed above except for the structure of the associated valve body and piston rod.

As shown in the embodiment illustrated in FIG. 4, the fluid control valve 200 includes a two-piece valve body, indicated generally at 212. The two-piece valve body 212 includes a first valve body 214 and a second valve body 216 secured to and spaced apart from one another. In the illustrated embodiment, a plurality of threaded fasteners 218 and nuts 220 are used to secure the first valve body 214 and the second valve body 216 together (two of such fasteners 218 and nuts 220 being illustrated in FIG. 3). Each fastener 218 extends through a pair of aligned openings 222 and 224 formed in respective outer flanges 226 and 228 of the valve bodies 214 and 216, respectively. A rigid tube 230 is disposed about the body of the fastener 218 to space the valve bodies 214 and 216 apart from one another a predetermined distance X. Alternatively, other methods can be used to space apart and/or secure together the valve bodies 214 and 216. For example, a threaded rod (not shown) and nuts (not shown) on each end thereof can be used to secure the valve bodies together. Also, the valve body 212 can include more or less than two components if so desired. For example, the valve body 212 could be of a one-piece construction.

The fluid control valve 200 further includes a plurality of shields or baffles 240 installed on the piston rod 92. In the illustrated embodiment, the piston rod 92 includes three shields 240 installed thereon and spaced apart from one another by suitable means. Each shield 240 is generally annular in shape and formed from a suitable material, such as for example, metal or plastic. In accordance with the present invention, the shields 240 are operative to prevent or slow down the migration of the fluid (i.e., glue, sealant, adhesive, etc.), along the piston rod 92 from the fluid side of the valve 300 (i.e., the right side in FIG. 4) to the air side of the valve 300 (i.e., the left side in FIG. 4) so as to prolong the operating life of the valve 300 before the valve 300 needs to be serviced/replaced. Such fluid travel occurs after sufficient wear of the fluid seal 112 occurs.

Each shield 240 can be permanently secured to the piston rod 92 by a suitable method, such as for example, by welding or using adhesives, or can be removably secured to the piston rod 92 by a suitable method, such as for example, by using mechanical fasteners or an interference fit therewith. Also, the shields 240 could be integrally formed with the rod 92. Preferably, once the shields 240 are secured to the piston rod 92 the shield 240 is not free to move relative thereto. Alternatively, the number, structure, material, location and/or the attachment of the shields 240 can be other than illustrated and described if so desired. For example, the valve 200 of this invention can include only a single shield 240 installed on the piston rod 92. Also, in this embodiment, the shield 240 is formed separate from the piston rod 92. Alternatively, the piston rod 92 could include one or more shields 240 which are formed integral therewith if so desired. Also, in this embodiment, the valve body 212 has an essentially open framework or construction between the first valve body 214 and the second valve body 216 except for the tubes 230. Alternatively, the valve body 214 could be of a more closed framework than that which is illustrated and provided with one or more openings formed therein, such opening(s) being similar in function to that of the opening 38 described and illustrated above in connection with the prior art fluid control valve 10 illustrated in prior art FIGS. 1 and 2. Also, one or more shields 240 could be secured, permanently or removably, by suitable means, to the valve body 212 itself (such as the shields 240A shown in phantom in FIG. 4), instead of to the piston rod 92 so long as the shields 240 achieve their intended purpose.

Figure 5:
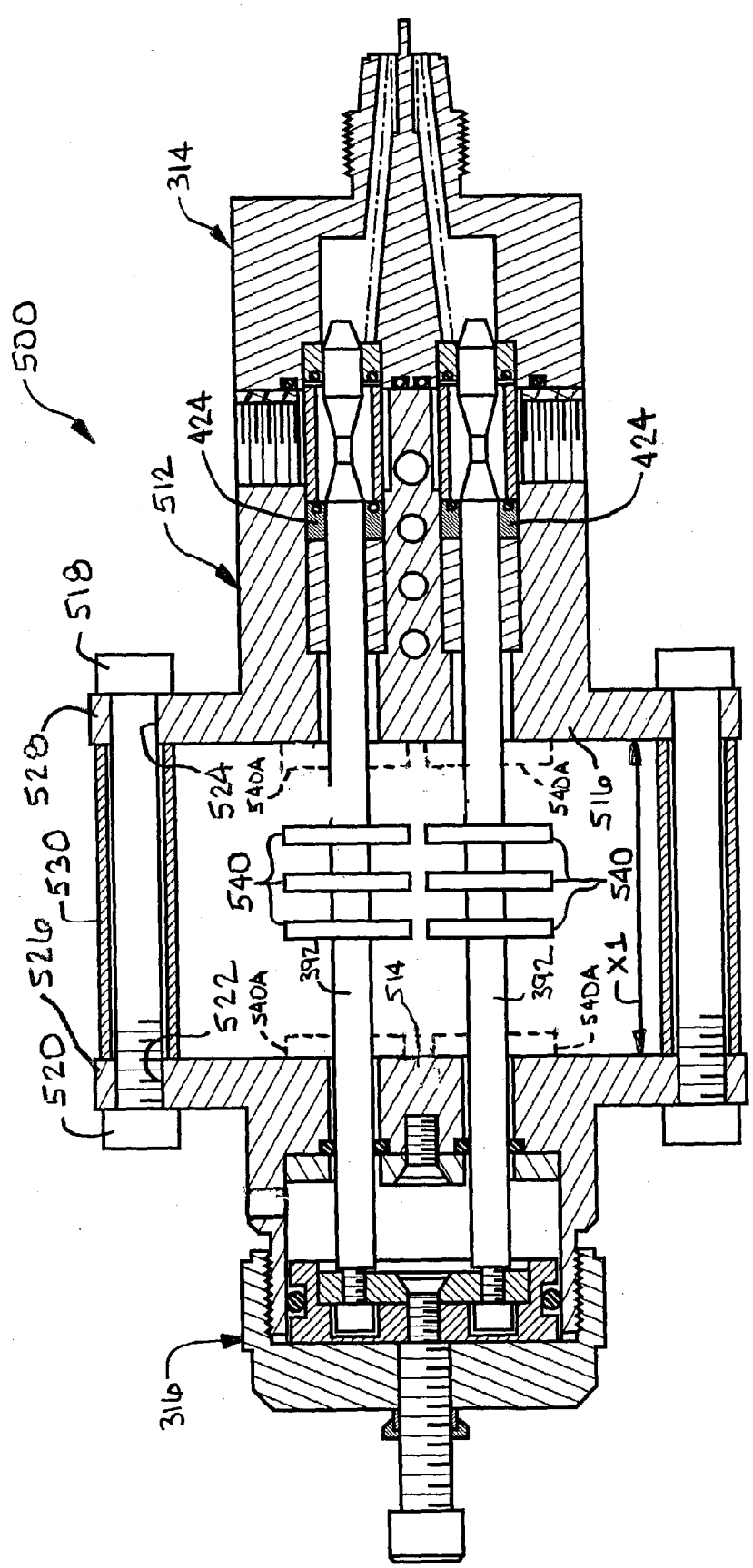
FIG. 5 is a sectional view of a second embodiment of a fluid control valve in accordance with the present invention.

Turning now to FIG. 5 and using like reference numbers to indicate corresponding parts, there is illustrated a second embodiment of an air operated fluid control glue valve, indicated generally at 500, constructed in accordance with this invention. As shown therein, the fluid control valve 500 is similar to the prior art fluid control valve 300 discussed above except for the structure of the associated valve body and piston rod.

As shown in FIG. 5, the fluid control valve 500 includes a two-piece valve body, indicated generally at 512. The two-piece valve body 512 includes a first valve body 514 and a second valve body 516 secured to and spaced apart from one another. In the illustrated embodiment, a plurality of threaded fasteners 518 and nuts 520 are used to secure the first valve body 514 and the second valve body 516 together (two of such fasteners 518 and nuts 520 being illustrated in FIG. 5). Each fastener 518 extends through a pair of aligned openings 522 and 524 formed in respective outer flanges 526 and 528 of the valve bodies 514 and 516, respectively. A rigid tube 530 is disposed about the fastener 518 to space the valve bodies 514 and 516 apart from one another a predetermined distance X1. Alternatively, other methods can be used to space apart and/or secure together the valve bodies 514 and 516. For example, a thread rod (not shown) and nuts (not shown) on each end thereof can be used to secure the valve bodies together. Also, the valve body 512 can include more or less than two components if so desired. For example, the valve body 512 could be of a one-piece construction.

The fluid control valve 500 further includes a plurality of shields or baffles 540 installed on the piston rods 392. In the illustrated embodiment, each of the piston rods 392 includes three shields 540 installed thereon and spaced apart from one another by suitable means. In accordance with the present invention, the shields 540 are operative to prevent or slow down the migration of the fluid (i.e., glue, sealant, adhesive, etc.), along the piston rod 392 from the fluid side of the valve 500 (i.e., the right side in FIG. 5) to the air side of the valve 500 (i.e., the left side in FIG. 5) so as to prolong the operating life of the valve 500 before the valve 500 needs to be serviced/replaced. Such fluid travel occurs after sufficient wear of the fluid seals 424 occurs.

Each shield 540 is generally annular in shape and formed from a suitable material, such as for example, metal or plastic. Each shield 540 can be permanently secured to the associated piston rod 392 by a suitable method, such as for example, by welding or using adhesives, or can be removably secured to the piston rod 392 by a suitable method, such as for example, by using mechanical fasteners or an interference fit therewith. Also, the shields 540 could be integrally formed with the rod 392. Preferably, once the shield 540 is secured to the piston rod 32 the shield 540 is not free to move relative thereto. Alternatively, the number, structure, material, location and/or the attachment of the shield 540 can be other than illustrated and described if so desired. For example, the valve 500 of this invention can include only a single shield 540 installed on each of the piston rod 392. Also, in this embodiment, the shield 540 is formed separate from the piston rod 392. Alternatively, the piston rod 392 could include one or more shields 540 which are formed integral therewith if so desired. Also, in this embodiment, the valve body 512 has an essentially open framework or construction between the first valve body 514 and the second valve body 516 except for the tubes 530. Alternatively, the valve body 514 could be of a more closed framework than that which is illustrated and provided with one or more openings formed therein, such opening(s) being similar in function to that of the openings 338 and 340 described and illustrated above in connection with the prior art fluid control valve 300 illustrated in prior art FIG. 3. For example, the valve 300 of this invention can include only a single shield 540 installed on each of the piston rods 392. Also, in this embodiment, the shield 540 is formed separate from the associated piston rods 392. Alternatively, each of the piston rods 392 could include one or more shields 540 which are formed integral therewith if so desired. Also, one or more shields 540 could be secured, permanently or removably by suitable means, to the valve body 512 itself (such as the shields 540A shown in phantom in FIG. 5), instead of to the piston rod 392 so long as the shields 540 achieve their intended purpose.

Figure 6:
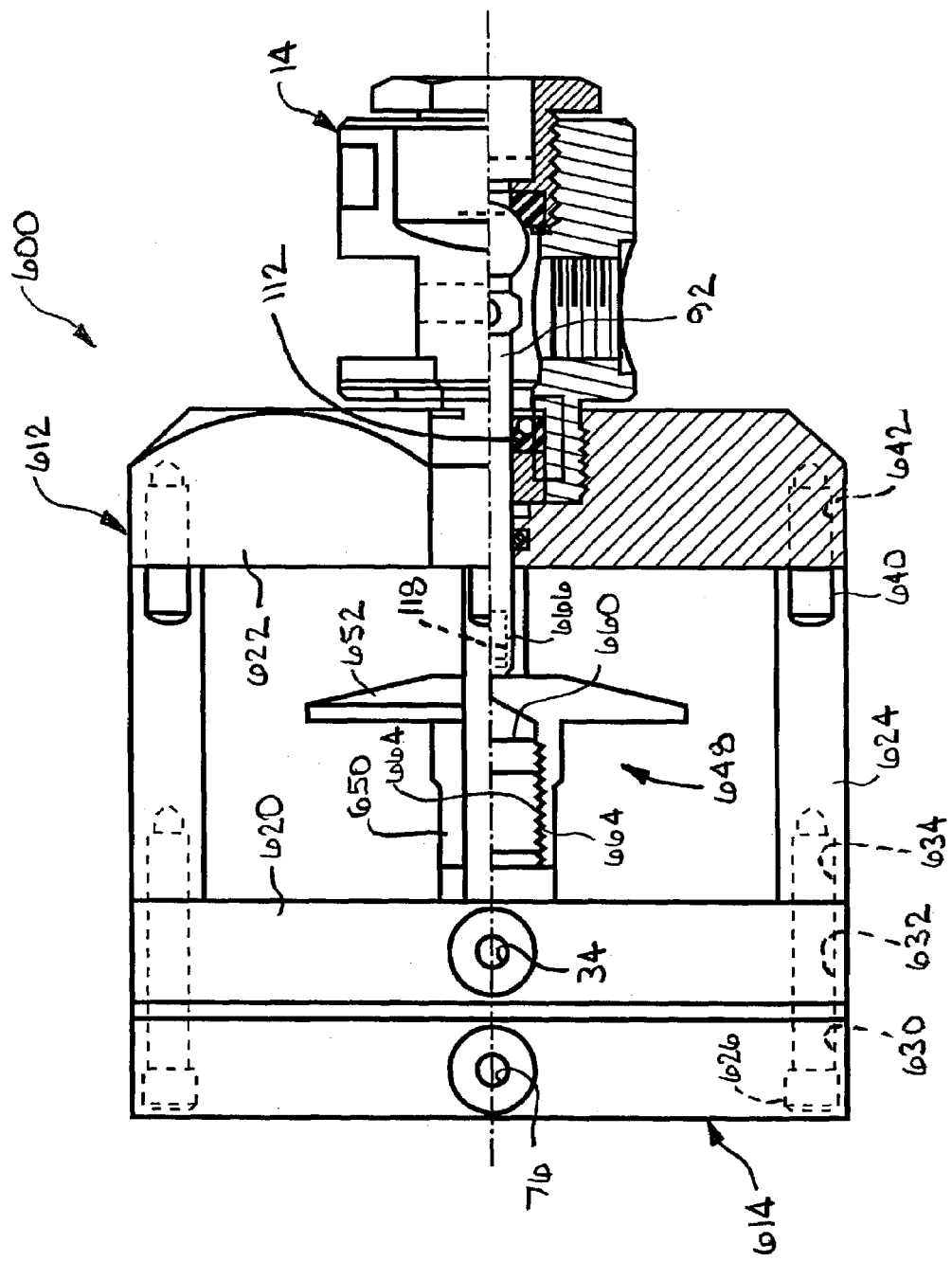
FIG. 6 is a sectional view of a third embodiment of a fluid control valve in accordance with the present invention.

Turning now to FIG. 6 and using like reference numbers to indicate corresponding parts, there is illustrated a third embodiment of an air operated fluid control valve, indicated generally at 600, constructed in accordance with this invention. As shown therein, the fluid control valve 600 is similar to the prior art fluid control valve 10 discussed above except for the structure of the associated valve body 612, piston rod assembly 648, and valve cap 614.

As shown in FIG. 6, the fluid control valve 600 includes a two-piece valve body, indicated generally at 612, a valve cap 614, and a piston member 616. The two-piece valve body 612 includes a first valve body 620 and a second valve body 622 secured to and spaced apart from one another by fasteners and rigid support rods 624.

In the illustrated embodiment, a plurality of threaded fasteners 626 (two of such fasteners 626 being illustrated in FIG. 6), are used to secure the first valve body 620 and also the valve cap 614 to a first end of the support rods 624. Each fastener 626 extends through a pair of aligned openings 630 and 632 formed through the valve cap 614 and the first valve body 620, respectively, and are received in a threaded opening 634 provided in the support rod 624.

The second valve body 622 is secured to an opposite end of the support rods 624. In the illustrated embodiment, to accomplish this the support rods 624 include a threaded fastener 640 which is disposed therein and has a threaded end which is in installed in an internally threaded opening 642 provided in the second valve body 622. Alternatively, the construction of the valve body 612 can be other than illustrated if so desired.

The piston rod assembly 648 includes a coupler 650, a combination shaft connector and shield 652, the piston rod 92, and a piston (not shown but can be similar to the piston 90 shown in connection with the prior art fluid control valve illustrated and described above in prior art FIGS. 1 and 2). The coupler 650 includes a first end (not shown) operatively connected to the piston (not shown), and an opposite second end 660 connected to the shaft connector and shield 652 by suitable means. In the illustrated embodiment, to accomplish this the coupler 650 includes an internally threaded opening 662 and the shaft connector and shield 652 includes an externally threaded end 664. The shaft connector and shield 652 is connected to the piston rod 92. In the illustrated embodiment, to accomplish this the shaft connector and shield 652 includes an externally threaded extension 666 which is threadably disposed in the internally threaded opening 118 of the piston rod 92. Alternatively, the number, structure, material, location and/or the attachment of the shaft connector and shield 652 can be other than illustrated and described if so desired. For example, the valve 600 of this invention can include a shaft connector and shield 652 having more than one shield member installed thereon. Also, in this embodiment, the shield member is formed integral with the shaft connector portion. Alternatively, the piston rod assembly 648 could include one or more shields formed separate from the shaft connector portion and secured thereto by suitable means if so desired. In accordance with the present invention, the shields 652 is operative to prevent or slow down the migration of the fluid (i.e., glue, sealant, adhesive, etc.), along the piston rod 92 from the fluid side of the valve 600 (i.e., the right side in FIG. 6) to the air side of the valve 600 (i.e., the left side in FIG. 6) so as to prolong the operating life of the valve 600 before the valve 600 needs to be serviced/replaced. Such fluid travel occurs after sufficient wear of the fluid seal 112 occurs.

Also, in this embodiment, the valve body 612 has an essentially open framework or construction between the first valve body 620 and the second valve body 620 except for the support rods 624. Alternatively, the valve body 612 could be of a more closed framework than that which is illustrated and provided with one or more openings formed therein, such opening(s) being similar in function to that of the openings 338 and 340 described and illustrated above in connection with the prior art fluid control valve 300 illustrated in prior art FIG. 3.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. An air operated fluid control valve comprising:
   a control valve having a valve body provided with at least one fluid inlet port and at least one fluid outlet port, at least one air inlet port and at least one air outlet port, and a piston assembly selectively controlled by said at least one air inlet and outlet ports so as to regulate the flow of a fluid through said valve body from the at least one fluid inlet port to the at least one fluid outlet port; and at least one non-sealing shield carried by said control valve, said non-sealing shield operative to slow down the migration of a fluid from a fluid side of the control valve into an air controlled side of said control valve.

2. The air operated fluid control valve according to claim 1 wherein said at least one non-sealing shield is carried by said piston assembly.

3. The air operated fluid control valve according to claim 1 wherein said at least one non-sealing shield is carried by said valve body.

4. The air operated fluid control valve according to claim 1 wherein said piston assembly includes a piston rod and said at least one non-sealing shield is carried by said piston rod.

5. The air operated fluid control valve according to claim 4 wherein said at least one non-sealing shield is permanently secured to said piston rod.

6. The air operated fluid control valve according to claim 4 wherein said at least one non-sealing shield is removably secured to said piston rod.

7. The air operated fluid control valve according to claim 1 wherein said valve body includes a first valve body and a second valve body secured to and spaced apart from one another to provide a generally open valve body framework.

8. The air operated fluid control valve according to claim 1 wherein said control valve includes a pair of piston assemblies each having a piston rod and at least one non-sealing shield is carried by each of said piston rods.

9. The air operated fluid control valve according to claim 1 wherein said control valve further includes at least a pair of sealing seals operatively carried by said piston assembly.

10. An air operated fluid control valve comprising:

a control valve having a valve body provided with at least one fluid inlet port and at least one fluid outlet port, at least one air inlet port and at least one air outlet port, and a piston assembly selectively controlled by said at least one air inlet and outlet ports so as to regulate the flow of a fluid through said valve body from said at least one fluid inlet port to said at least one fluid outlet port, said valve body including a first valve body and a second valve body secured to and spaced apart from one another to provide a generally open valve body framework; and at least one non-sealing shield carried by said piston assembly, said non-sealing shield operative to slow down the migration of a fluid from a fluid side of said control valve into an air controlled side of said control valve.

11. The air operated fluid control valve according to claim 10 wherein said piston assembly includes a piston rod and said at least one non-sealing shield is carried by said piston rod.

12. The air operated fluid control valve according to claim 11 wherein said at least one non-sealing shield is permanently secured to said piston rod.

13. The air operated fluid control valve according to claim 11 wherein said at least one non-sealing shield is removably secured to said piston rod.

14. The air operated fluid control valve according to claim 10 wherein said control valve includes a pair of piston assemblies each having a piston rod and at least one non-sealing shield is carried by each of said piston rods.

15. The air operated fluid control valve according to claim 10 wherein said control valve further includes at least a pair of sealing seals operatively carried by said piston assembly.

16. An air operated fluid control valve comprising:

a control valve including a valve body, a fluid body secured to a first end of said valve body, and a valve cap secured so a second opposite end of said valve body, said control valve provided with at least one fluid inlet port and at least one fluid outlet port, at least one air inlet port and at least one air outlet port, and a piston assembly selectively controlled by said at least one air inlet and outlet ports so as to regulate the flow of a fluid through said valve body from said at least one fluid inlet port to said at least one fluid outlet port, said piston assembly including at least one piston rod; and at least one non-sealing shield permanently secured to said piston rod, said at least one non-sealing shield operative to slow down the migration of a fluid from a fluid side of said control valve into an air controlled side of said control valve.

17. The air operated fluid control valve according to claim 16 wherein said valve body includes a first valve body and a second valve body secured to and spaced apart from one another to provide a generally open valve body framework.

18. The air operated fluid control valve according to claim 16 wherein said control valve includes a pair of piston assemblies each having a piston rod and at least one non-sealing shield is carried by each of said piston rods.

19. The air operated fluid control valve according to claim 16 wherein said control valve further includes at least a pair of sealing seals operatively carried by said piston assembly.

* * * * *